June 3, 1930.  J. F. O'CONNOR  1,761,272
SHOCK ABSORBER
Filed July 29, 1926
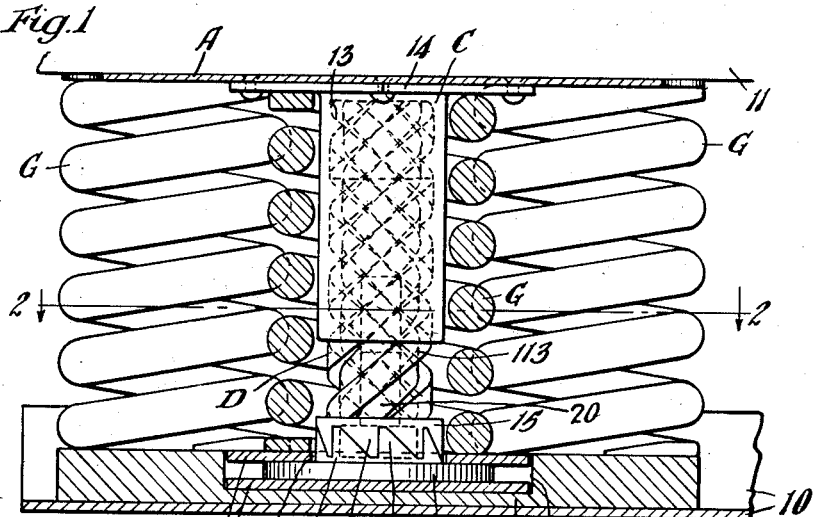
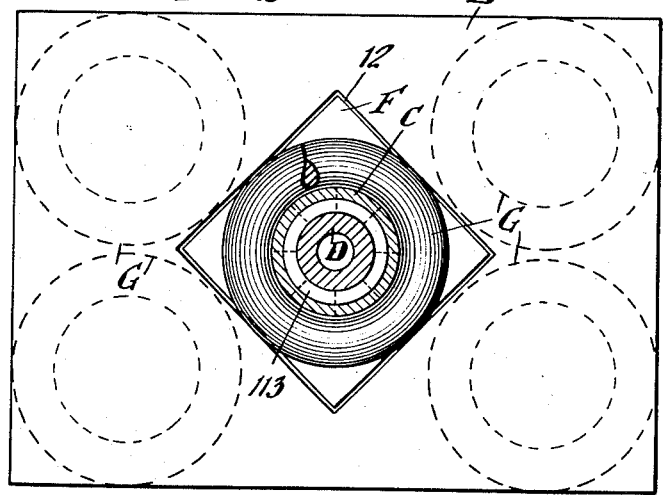
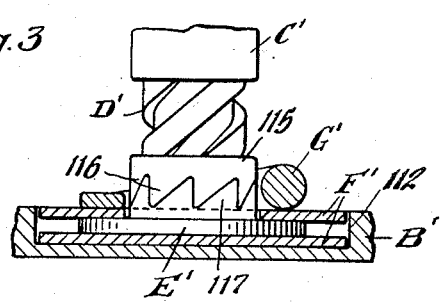
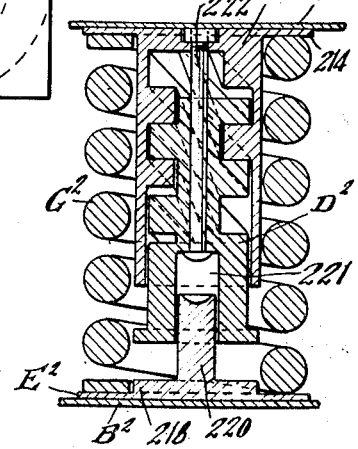
Witness
Wm. Geiger
Inventor
John F. O'Connor
By George I. Haight
His Atty.

Patented June 3, 1930

1,761,272

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK ABSORBER

Application filed July 29, 1926. Serial No. 125,605.

This invention relates to improvements in shock absorbers, and more particularly to shock absorbers adapted for railway cars.

As is well known to those skilled in the art of railway rolling stock and equipment, there has been from year to year a gradual increase in the size of railway cars and a corresponding increase in load carrying capacity for cars, until service conditions have become such as to tax the capacity of truck springs possible to employ. Inasmuch as the space which may be occupied by the truck springs of cars is very strictly limited by regulations of standardization, and therefore the size and number of springs that may be employed cannot exceed a certain limit, it is common that the springs ordinarily employed are compressed to such an extent when the cars are fully loaded that they afford very little cushioning effect where the car is in motion. Breakage of the springs in service frequently occurs due to the same being constantly overloaded, by impact.

It is one object of my invention to provide an arrangement of shock absorber or cushioning means for railway car trucks, which includes a dampening feature, and which functions when car is passing over an uneven track, or subject to other sudden increases of load.

Another object of the invention is to provide a cushioning means of high capacity for car trucks, including friction means acting in conjunction with spring means, wherein the friction means is operative only when the added compression beyond static position, exceeds a certain amount, within the free action of the spring, and permitting return of the parts without frictional resistance during recoil of the springs. This static position is set automatically by the load, and allows the same amount of vertical reciprocation, in any position, between that of a light and fully loaded car.

Still another object of the invention is to provide a shock absorbing means for trucks of cars, including friction means in combination with spring means wherein a certain amount of preliminary compression of the springs is permitted to take care of the lighter shocks, before the friction means becomes operative to take care of excessively heavy shocks.

More specifically, an object of my invention is to provide in a cushioning means for car trucks, friction means acting in combination with spring means, wherein the friction means is of the rotative, screw operated type, and is operative only during compression of the cushioning means.

Other objects and advantages of my invention will more fully and clearly appear from a description and claims hereinafter following.

In the drawings, forming a part of this specification, Figure 1 is a transverse, vertical, sectional view through a portion of a car truck, illustrating an embodiment of my invention in connection therewith and at the end of the free downward spring action. Figure 2 is a horizontal sectional view corresponding substantially to the line 2—2 of Figure 1. Figure 3 is a view similar to Figure 1, partly broken away, illustrating another embodiment of my invention also at end of free spring closure. And Figure 4 is a vertical, sectional view through a friction element and central spring member of a still further embodiment of my invention, showing it in full release under static load.

In said drawings, referring first to the embodiment of the invention illustrated in Figures 1 and 2, 10 designates the usual spring plank of a car truck, which as is well known bears on the side frame proper of the truck. 11 indicates the bottom side of the usual truck bolster. My improved shock absorbing mechanism is interposed between the truck bolster 11 and the spring plank 10 as is usual.

My improved shock absorbing or cushioning means comprises broadly: A top spring plate or follower A; a bottom spring plate or follower B; a cylindrical internally threaded member C; a friction screw D; a friction disc E; a pair of friction plates F—F; and five spring elements G.

The spring elements G, which are of the usual truck spring type, are interposed between the top spring follower plate A and the bottom spring follower plate B. The arrangement of the five springs, comprising a central spring and four springs disposed about the central spring, is common and well known in this art. In order to increase the capacity of this spring arrangement, I employ in addition thereto a friction means comprising the internally threaded cylinders C, screw D and co-operating friction plates E, F and F.

The top spring plate or follower A is of the usual form employed in connection with the five spring arrangement and bears on the lower side of the truck bolster 11.

The bottom spring plate or follower B is in the form of a relatively heavy substantially rectangular block having a square recess 12 on the upper side thereof as most clearly shown in Figure 2. The recess 12 is adapted to accommodate the two square friction plates F—F as more fully hereinafter described. The spring follower plate B rests directly on the upper face of the spring plank 10. The friction cylinder C is hollow as shown and is internally threaded as designated by 13, the threads 13 being of relatively steep pitch. In the form of the invention illustrated in Figures 1 and 2, the threads 13 are of the triple type. The cylinder C has a plate like top flange 14 by which it is supported from the spring follower plate A. Any suitable means may be provided for securing the flange 14 to the plate A, rivets being shown in this instance. The cylindrical member C as shown is freely accommodated within the coil of the central spring G.

The screw D is also provided with triple threads 113 of relatively steep pitch, which co-operate with the threads 13 of the cylinder C. At the lower end, the screw D is provided with a disc like head or enlargement 15 having clutch teeth 16 at the lower side thereof. The clutch teeth 16 of the head 15 co-operate with similar teeth 17 on an upwardly projecting boss 18 formed integral with the friction disc E.

The friction disc E rests upon the lowermost friction plate F and the upper friction plate F rests on top of the disc E and has a central circular opening 19 adapted to accommodate the boss 18. The boss 18 is also provided with an upwardly projecting cylindrical stem 20 extending into the lower end of the screw D to properly center the parts.

As clearly shown in the drawings, the lower end of the hollow cylindrical screw C is spaced an appreciable distance from the upper face of the head 15 on the screw D and the upper end of the screw D terminates some distance from the top end threaded hollow portion of the cylinder. As will be clear from Figure 1, the threads on the screw and cylinder are so arranged and the co-operating clutch teeth 16 and 17 are so disposed that the screw D will be rotated in such a direction as to interlock the clutch teeth and compel rotation of the disc E with the screw as the top follower plate A is moved downwardly toward the bottom plate B, beyond the position shown in Fig. 1.

The central spring G bears directly at its upper end on the flange 14 of the cylinder C and at its lower end directly on the topmost friction plate F. The remaining springs G are interposed directly between the top spring follower plate A and the bottom spring follower plate B.

In the operation of my improved device, as shown in Figures 1 and 2, when the truck bolster 11 and the spring plank 10 approach each other in the usual manner during the operation of the car, the springs G will all be compressed. As the spring follower plates approach each other, the cylinder C will also approach the head 15 of the screw D and due to the interengaging threads of these parts, the head 15 will be rotated when the vertical play exceeds the depth of the clutch teeth, communicating rotation to the friction disc E by means of the interengaging clutch teeth 16 and 17. The friction disc E will thus be rotated with reference to the friction plates F which are held stationary. It will be evident that rotation of the plates F will be prevented due to their square outline, these plates snugly fitting the square recess 12 of the lower spring plate or follower B. While the followers A and B approach each other, friction will be created between the interengaging threads of the screw D and the cylinder C in addition to the friction created between the friction disc E and the discs F, thereby augmenting the resistance offered by the five springs G. Compression of the springs will be limited by engagement of the lower end of the cylinder C with the head 15 of the screw.

When the shock or shocks have been absorbed, the springs G will act to return the parts to their normal position. During this time, there will be no frictional resistance created inasmuch as the co-operating clutch teeth of the screw and friction disc E are free to disengage, permitting the screw D to be lifted with the cylinder C with slight rotation. When the negative truck bolster has been returned to normal position, the screw D will automatically adapt itself to proper position, permitting the prescribed free vertical oscillations, which are sufficient for normal running conditions.

The clutch teeth 16 and 17 will come into engagement at and rest, at some intermediate position. With the parts in this last named position, the screw will not be actuated during the initial approach or recession of the truck bolster 11 and the spring plank 10 and there will be compression of the springs G only until such a time when the teeth 16 and 17 are forced into full engagement or the position shown in Figure 1. After the teeth have engaged and positively locked the head 15 to the friction plate E, the latter will be rotated in the manner hereinbefore described.

It will be evident that a preliminary spring action is thus available to absorb the lighter shocks under normal conditions, the heavier frictional resistance coming into action only when relatively heavy shocks are encountered.

Referring next to the embodiment of the invention illustrated in Figure 3, the mechanism shown is substantially the same as that illustrated in Figures 1 and 2 with the exception that the interengaging teeth on the screw and the friction disc are reversely inclined. In Figure 3, B' designates the lower spring follower plate which has the square friction plates F'—F' mounted in an aperture 112 in the top of the plate. The friction disc is designated by E' and is provided with an upstanding cylindrical boss having clutch teeth 117 co-operating with clutch teeth 116 on the head 115 formed integral with the lower end of the screw D' which co-operates with the hollow threaded cylinder C'. The cylinder C' is preferably mounted on the top follower plate in the same manner as the cylinder C described in connection with the embodiment of the invention illustrated in Figures 1 and 2.

The device illustrated in Figure 3 is associated with a central spring G' similar to central spring G hereinbefore referred to, and four additional springs disposed about the central spring G' are employed in a manner similar to the four outer springs G hereinbefore described.

The operation of the device illustrated in Figure 3 is substantially the same as that of the device described in connection with Figures 1 and 2, the inclination of the interengaging faces of the clutch teeth 116 and 117 being such as to prevent relative rotation of the screw D' and the friction disc E' when the truck bolster and the spring plank are moved relatively to each other and within their depth. To effect rotation of the friction plate the teeth must be fully meshed and then have additional action of the truck bolster in downward direction.

Referring next to the embodiment of the invention illustrated in Figure 4, A² designates the top spring follower plate and B² the bottom spring follower plate. Attached to the spring follower plate A² is a hollow internally threaded cylinder C² in all respects similar to the cylinder C hereinbefore described. A screw D² co-operates with the threads of the cylinder. Five springs are interposed between the follower casings A² and B² in a manner similar to that shown in Figures 1 and 2, the central spring of the group being designated by G². The spring G² is interposed between a flange 214 at the upper end of the cylinder C² and a friction disc E² bearing directly on top of the lower spring follower plate B². The friction disc E² is provided with an upwardly extending boss 218 having a flat upper face. The disc E² is also provided with a centrally disposed upwardly extending stem 220 projecting into a cylindrical opening 221 at the lower end of the screw D². The screw D² is anchored to the cylinder C² by a retainer bolt 222 extending through a vertical bore in the screw and having the threaded end thereof disposed within the opening 221, the nut of the bolt being disposed in a suitable recess at the top end of the cylinder C². The bolt 222 is of such a length as to permit a certain amount of relative movement of the cylinder and the screw.

In the normal position of the parts as shown in Figure 4, the bolt 222 supports the screw D² in a partly raised position so that the lower end thereof is spaced from the upper face of the boss 218 on the disc E². It will be evident that during the initial approach of the truck bolster and the spring plank, the springs between the plates A² and B² will be compressed without any relative movement between the screw D² and the cylinder C² being effected. After the springs have been compressed, to a certain extent, the lower end of the screw D² will engage the upper face of the enlargement 218 on the friction disc E², thereby arresting further downward movement of the screw D². During the further approach of the spring follower plates A² and B², rotation of the screw D² will be effected through the interengaging threads of the screw and cylinder. Friction will thus be created between these threads. Friction will further be created between the lower end of the screw and the top surface of the boss 218. Due to the friction between the lower end of the screw D² and the upper face of the boss 218, it is also possible that a slight rotation of the friction disc E² will be effected. In the latter case, friction will be created between the bottom face of this disc and the spring follower plate B². When the shock has been absorbed, the springs will return the parts to the normal position shown in Figure 4. There will be no frictional resistance during the recoil of the springs because the lower end of the screw D will immediately be disengaged from the upper friction surface of the disc E². When the parts have been returned to their normal position, the screw D will rotate downwardly due to the action of gravity until limited by the head of the bolt 222.

From the preceding description taken in connection with the drawings, it will be evident that I have provided a shock absorbing device of extremely simple construction which is highly efficient and offers high resistance during approach of the truck bolster and sprink plank, but offers no frictional resistance to the free return of the parts.

While I have herein shown and described what I now consider the preferred manner of carrying out my invention, the same is merely illustrative, and I contemplate all changes and modifications that come within the scope of the claims appended hereto.

I claim:

1. In a shock absorber, the combination with spring followers movable relatively toward and away from each other, the combination with cushioning spring means interposed between said followers; of a friction device interposed between said followers, said friction device including relatively rotatable screw and nut elements, one of said elements being fixed to one of the followers and the other of said elements being freely rotatable with respect to the other element under the action of gravity when said followers are separated and adapted to engage one of said followers upon relative approach of the same to effect positive relative rotation of said screw elements.

2. In a shock absorbing mechanism, the combination with relatively movable spring follower plates; of spring means interposed between said follower plates; co-operating friction screw elements, one of which is fixed to one of said spring follower plates and the other of which is normally freely rotatable; and rotary friction means engaging the other follower plate and cooperating with said screw to retard rotary movement thereof upon relative approach of said followers.

3. In a shock absorbing mechanism, the combination with relatively movable spring follower elements; of spring means interposed between said elements and opposing relative approach of the same co-operating friction screw elements, one of which is fixed to one of said followers and the other of which is relatively movable; and means operative upon relative movement of the bolsters toward each other, after a predetermined compression of the spring means to frictionally oppose rotation of said movable screw element, said last named means being inactive during movement of said bolsters away from each other under the influence of the spring means.

4. In a shock absorber for railway car trucks, the combination with follower members movable toward and away from each other; of spring means opposing relative approach of said follower members; friction means including relatively movable friction elements interposed between said follower members, one of said friction elements being movable with one of said follower members and the cooperating friction element being entirely disconnected from the other follower and freely movable away from the same during movement of said follower members away from each other, said last named element being normally spaced from said last named follower member to provide for preliminary action during the first part of the relative movement of said follower members toward each other, and adapted to be engaged by one of said follower members to effect relative movement of the friction elements during the further movement of the followers toward each other.

5. In a shock absorber, the combination with a pair of followers relatively movable toward and away from each other; of spring means opposing relative approach of said followers; a pair of interengaging cooperating friction screw elements, one of said elements being fixed to one of said followers and movable in unison therewith toward the other follower, and the other screw element being movable with respect to said follower; and means for limiting relative separation of said screw elements to hold said movable screw elements spaced from said other follower when said followers are separated to the full extent of their movement, said movable screw element engaging said other follower after a predetermined compression of the mechanism, to be actuated by the further relative approach of said followers.

6. In a cushioning means for railway car trucks, including a pair of followers, said followers being relatively movable toward each other upon relative approach of the car body and truck; of spring means interposed between said followers for yieldingly supporting the car body on the truck, said spring means including a central coil and a plurality of coils surrounding said central coil; friction means interposed between said followers, said means being disposed within said central coil, said friction means including a friction element which is movable with one of said followers and a cooperating friction element which is movable with respect to said first named element; and means for limiting relative separation of said friction elements, to hold the second named friction element spaced from the other follower when said followers are separated to the full extent of their movement, said spacing being less than the full amount of relative movement of said followers, whereby said last named friction element engages the cooperating follower to effect relative movement of said friction elements during relative approach of said followers.

7. In a shock absorber, the combination with two follower members relatively movable toward each other; of a friction device interposed between said followers and positively actuated only upon relative approach of said followers, said friction device including relatively movable friction elements, one of which is movable with one of said followers and the other of which is actuated by engagement with the other follower, said second named element being freely movable away from said last named follower at all times during movement of said followers away from each other; and spring means operating independently of said friction device yieldingly opposing approach of said followers, said spring means returning said followers to normal separated condition without actuating said friction device.

8. In a shock absorbing mechanism for car trucks, the combination with a cushioning spring unit for supporting the car body on the truck, said cushioning spring unit including a central coil and four additional coils surrounding said central coil, said four additional coils being of standard size; of friction means, including relatively rotatable friction elements disposed entirely within said central coil, operated during relative approach of said followers and compression of said cushioning means.

In witness that I claim the foregoing I have hereunto subscribed my name this 27th day of July, 1926.

JOHN F. O'CONNOR.